(12) United States Patent
Zhang et al.

(10) Patent No.: US 9,111,574 B2
(45) Date of Patent: Aug. 18, 2015

(54) DATA STORAGE DEVICE AND METHOD FOR GENERATING A REFERENCE CLOCK SIGNAL FOR DATA STORAGE DEVICE

(71) Applicant: MARVELL INTERNATIONAL LTD., Hamilton (BM)

(72) Inventors: Jingliang Zhang, Singapore (SG); Lin Thi @ Htwe Htwe Yee Lin, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/359,251

(22) PCT Filed: Nov. 21, 2012

(86) PCT No.: PCT/SG2012/000437
§ 371 (c)(1),
(2) Date: May 19, 2014

(87) PCT Pub. No.: WO2013/077811
PCT Pub. Date: May 30, 2013

(65) Prior Publication Data
US 2014/0327982 A1    Nov. 6, 2014

(30) Foreign Application Priority Data
Nov. 21, 2011    (SG) ................. 201108622-0

(51) Int. Cl.
*G11B 5/02*    (2006.01)
*G11B 20/10*    (2006.01)
*G11B 5/09*    (2006.01)
*G11B 20/12*    (2006.01)

(52) U.S. Cl.
CPC ...... *G11B 20/1024* (2013.01); *G11B 20/10027* (2013.01); *G11B 20/10222* (2013.01); *G11B 20/10259* (2013.01); *G11B 2020/1232* (2013.01); *G11B 2020/1281* (2013.01); *G11B 2020/1287* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 5,036,408 A * | 7/1991 | Leis et al. | | 360/48 |
| 5,119,248 A * | 6/1992 | Bizjak et al. | | 360/75 |
| 5,193,034 A | 3/1993 | Tsuyoshi et al. | | |
| 5,818,654 A | 10/1998 | Reddy et al. | | |
| 6,614,608 B1 * | 9/2003 | Belser et al. | | 360/48 |
| 2013/0155826 A1 * | 6/2013 | Zhang et al. | | 369/30.25 |

OTHER PUBLICATIONS

International Search Report and Written Opinion of the International Searching Authority for International Application No. PCT/SG2012/000437 dated Dec. 13, 2012, pp. 1-8.
International Preliminary Report on Patentability for International Application No. PCT/SG2012/000437 dated May 27, 2014, pp. 1-5.

* cited by examiner

*Primary Examiner* — K. Wong

(57) ABSTRACT

Various embodiments provide a data storage device. The data storage device includes a recording medium having a dedicated servo layer for providing servo information. The dedicated servo layer may include a plurality of servo patterns, wherein each servo pattern includes a preamble providing information for synchronization of at least one of a read and a write operation of the data storage device.

17 Claims, 9 Drawing Sheets

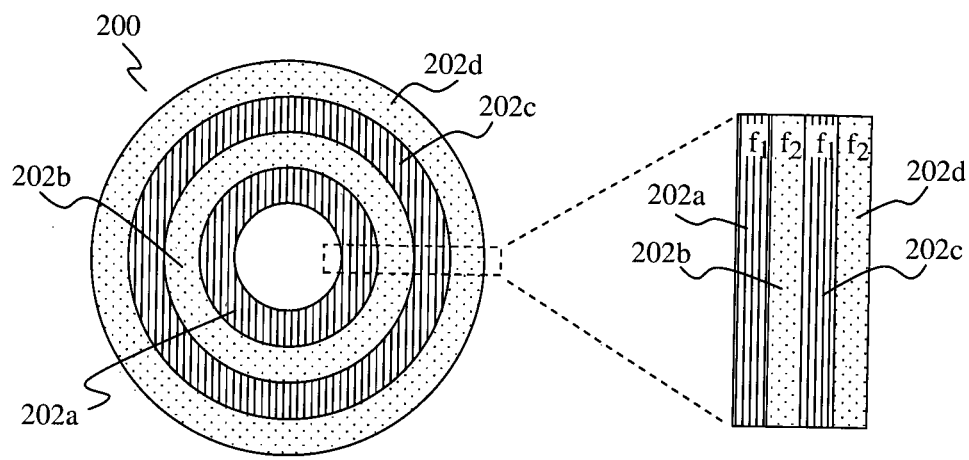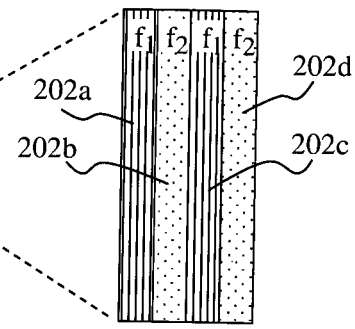
FIG. 2A  FIG. 2B
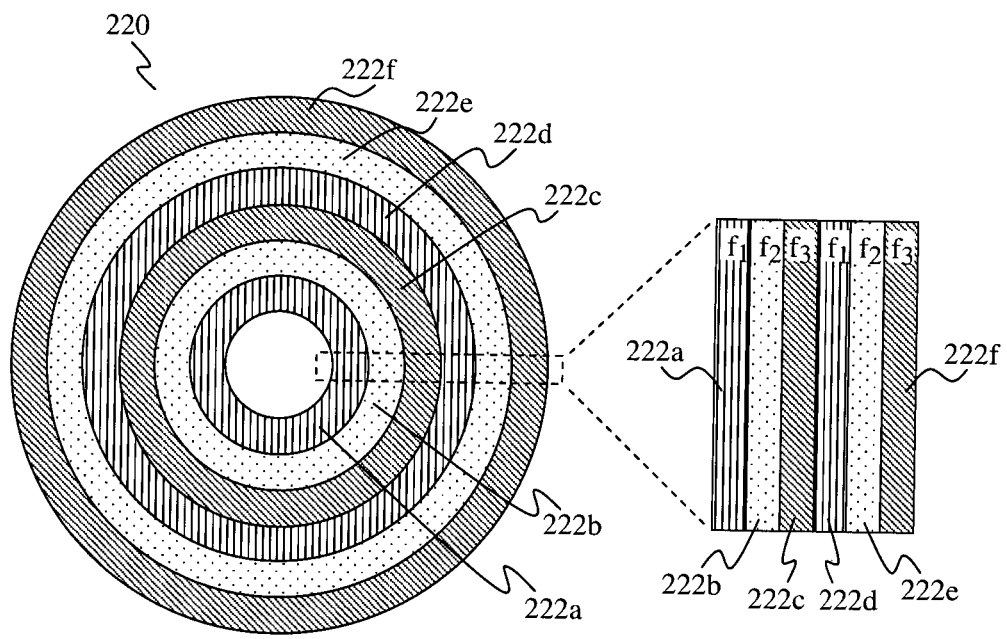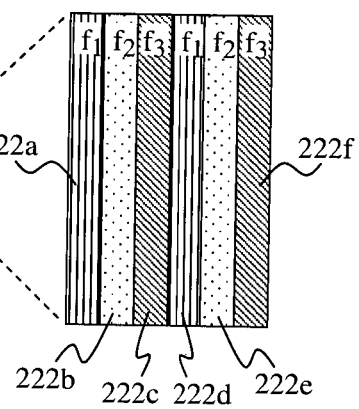
FIG. 2C  FIG. 2D

Generating a reference clock signal for synchronization of at least one of a read and a write operation of a data storage device, based on a plurality of servo patterns stored in a dedicated servo layer of the data storage device, wherein each servo pattern includes a preamble providing information for synchronization of at least one of the read and the write operation of the data storage device ⟿ 1002

Fig. 10

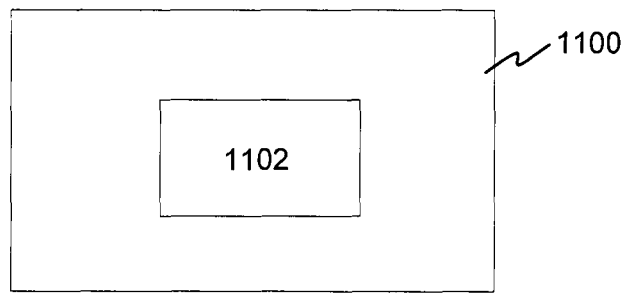

Fig. 11

DATA STORAGE DEVICE AND METHOD FOR GENERATING A REFERENCE CLOCK SIGNAL FOR DATA STORAGE DEVICE

CROSS-REFERENCE TO RELATED APPLICATIONS

The present application claims the benefit of the Singapore patent application 201108622-0 filed on 21 Nov. 2011, the entire contents of which are incorporated herein by reference for all purposes.

TECHNICAL FIELD

Embodiments relate generally to a data storage device and a method for generating a reference clock signal for a data storage device. Specifically, embodiments relate to a data storage device having a dedicated servo layer, and to a method for generating a reference clock signal for synchronization of at least one of a read and a write operation of a data storage device.

BACKGROUND

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

Data storage devices, for example hard disk drives (HDDs), employ servo systems for tracking and controlling the movement of the read/write head.

In a conventional hard disk drive having a rotating magnetic media, there is only one magnetic layer to record data. Servo systems, e.g., as shown in FIG. 1A, employ embedded servo where the servo information runs radially across the tracks 110 from the inner diameter (ID) to the outer diameter (OD) of the disc 100 in a series of "servo wedges" 120 interspersed with data 130. Therefore, the servo information is only detected when the read/write head moves over these servo wedges 120. In between the servo wedges, no servo information is received by the head.

Data storage devices also employ dedicated servo, e.g. as shown in FIG. 1B, where the servo information is provided on a servo layer 150 distinct from the data recording layer 160. In other words, a magnetic disk may include two magnetic layers, wherein the servo layer 150 is used to record servo patterns, and the data recording layer 160 is used to record user data.

Furthermore, in conventional hard disk drives and similar data storage devices, the head either reads or writes, but cannot perform both operations simultaneously.

SUMMARY

Various embodiments provide a data storage device. The data storage device includes a recording medium having a dedicated servo layer for providing servo information. The dedicated servo layer may include a plurality of servo patterns, wherein each servo pattern includes a preamble providing information for synchronization of at least one of a read and a write operation of the data storage device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 2A shows a schematic top view of a portion of a servo layer according to various embodiments, and FIG. 2B shows a schematic top view of a section of the servo layer of the embodiment of FIG. 2A.

FIG. 2C shows a schematic top view of a portion of a servo layer according to various embodiments, and FIG. 2D shows a schematic top view of a section of the servo layer of the embodiment of FIG. 2C.

FIG. 10 shows a flowchart illustrating a method for generating a reference clock signal for synchronization of at least one of a read and a write operation of a data storage device according to an embodiment.

FIG. 11 shows a device for generating a reference clock signal for synchronization of at least one of a read and a write operation of a data storage device according to an embodiment.

DESCRIPTION

Figure 1A:
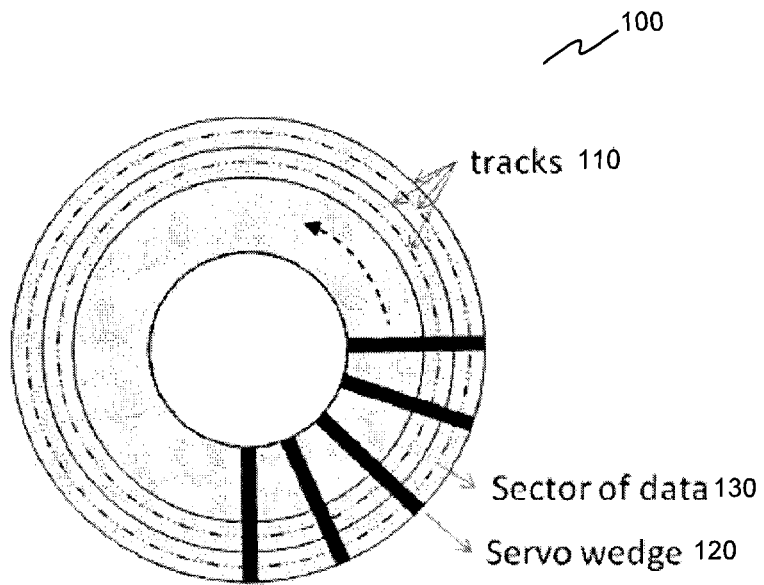
FIG. 1A shows a disk surface with embedded servo.
Figure 1B:
FIG. 1B shows a dual layer medium with dedicated servo.

In general, a head-positioning servomechanism is provided in a data storage device, e.g. a hard disk drive (HDD), which acts as a control system. The control system may position the head (e.g. read/write (R/W) head) which is mounted on an actuator over a desired data track of a storage medium and reposition the head from one data track to another.

In a HDD servo control system, the position of the head relative to the center of the desired data track, and therefore the position error signal (PES), may be sensed and used by the servo system to generate the appropriate commands to the actuator, which in turn moves the head in an effort to reduce the position error. PES is a signal proportional to the relative difference of the positions of the centre of the head and the nearest track centre. Therefore, the PES may provide an indication of the position of the head relative to the storage medium, for example the position of the head relative to a data track, and whether the head is positioned at the centre of the data track (on track) or shifted relative to the centre of the data track (off track) and the magnitude of the shift, such that the position of the head may, then be adjusted.

In a dedicated servo implementation, one disk surface (servo layer) is dedicated to store the position data referred to as servo data or servo signal. The servo layer may be a buried layer arranged beneath the data recording layer and may have a perpendicular or a longitudinal magnetization orientation for providing magnetic information for determining the location of the head in relation to the storage medium. The servo information is provided on the servo layer distinct from the data recording layer so as to allow continuously available servo readback to enable continual position feedback thereby providing continual location detection without utilizing any of the recording layer for location detection. This may provide higher positioning accuracy through continual location determination, while also removing the servo sectors/tracks from the recording layer, thereby increasing surface utilization of the storage space in the recording layer and further increasing the data recording density by increasing the track positioning accuracy. Further, the servo layer and the data layer may be put on the same side, and they may be read and/or processed together. This may also be referred to as dedicated servo.

The dedicated servo layer may have a continuous track structure having a plurality of servo tracks in a concentric arrangement. Each servo track may be assigned an identical frequency signal. In another example, adjacent servo tracks may be alternately assigned different frequency signals, having respective frequencies $f_1$ and $f_2$, as illustrated in FIGS. 2A and 2B for a portion of the servo layer 200 towards its inner diameter, showing four servo tracks 202a, 202b, 202c, 202d. In this configuration, the head of the data storage device may be positioned in between two adjacent tracks (e.g. 202a and 202b; 202b and 202c), for example at the boundary of the two adjacent tracks, and may be able to obtain a readback servo signal having frequencies $f_1$ and $f_2$.

In a further example, adjacent servo tracks may be alternately assigned different frequency signals, having respective frequencies $f_1$, $f_2$ and $f_3$, as illustrated in FIGS. 2C and 2D for a portion of the servo layer 220 towards its inner diameter, showing six servo tracks 222a, 222b, 222c, 222d, 222e, 222f. In an embodiment, the head may be positioned in between two adjacent tracks (e.g. 222a and 222b; 222c and 222d), for example at the boundary of the two adjacent tracks, and may be able to obtain a readback servo signal having two different frequencies (e.g. $f_1$ and $f_2$; $f_3$ and $f_1$). In another embodiment, the head may detect up to three adjacent tracks (e.g. 222a, 222b and 222c; 222c, 222d and 222e) of signals from the servo layer. The head may be centered over one track, where signals from the adjacent tracks on either side may also be received by the head to obtain a readback servo signal having three different frequencies (e.g. $f_1$, $f_2$ and $f_3$), while signals from tracks further removed may not be received by the head.

Therefore, in various embodiments of a dedicated servo system, each servo track has a single frequency. The position error signal (PES) may be produced from the frequency based servo signal, including, for example, dual/triple frequency based single tone signals. Using the dual frequency based servo signal as an example, during track following, the center of the head may be positioned at the middle of two adjacent servo tracks, whereby the head picks up a readback servo signal having two frequencies from the two adjacent servo tracks at the same time.

A phase lock loop (PLL) can precisely lock to the phase of one single frequency instantly. However, if the head moves away from the locked frequency track, the signal becomes weak and the performance of PLL may degrade.

Figure 3:
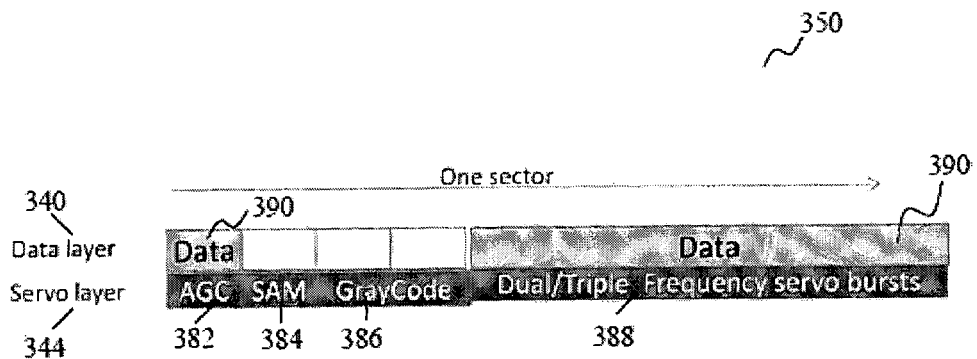
FIG. 3 shows a layout of servo pattern for dedicated servo.

FIG. 3 shows a design for disk recording medium 350 which locates the servo information on a buried servo layer 344.

In FIG. 3, all of the servo patterns are written on the buried servo layer 344. The automatic gain control (AGC) 382 is a number of bursts at a fixed frequency. The sector address mark (SAM) 384 and the GrayCode (track address) 386 is coded in accordance with conventional methods. Servo bursts 388 are dual or triple frequency bursts as described above, which is used for demodulation of the PES (position error signal). To make sure that the SAM 384 and the GrayCode 386 can be decoded correctly, no data is written on the corresponding portions of the top data layer 340 above these codes (i.e. the SAM 384 and the GrayCode 386), whereas data is written on the corresponding portions 390 of the data layer 340 above the AGC 382 and the servo bursts 388. In servo patterns, the SAM 384 and the GrayCode 386 occupy a very small portion. Therefore, this design will significantly increase the space efficiency as compared with conventional one-layer magnetic recording schemes.

Figure 4:
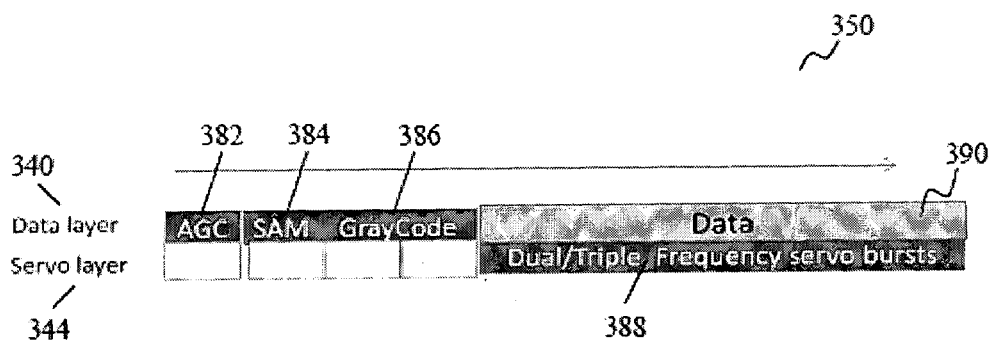
FIG. 4 shows another layout of servo pattern for dedicated servo.

FIG. 4 shows another design for disk recording medium 350 which locates the servo information on the buried servo layer 344 and on the data layer 340.

In FIG. 4, the AGC 382, the SAM 384 and the GrayCode 386 are all written on the data layer 340 while the servo bursts 388 are placed on the buried servo layer 344. To make sure that the SAM 384 and the GrayCode 386 can be decoded correctly, no servo bursts are written on the corresponding portions of the buried servo layer 344 below these codes.

In various embodiments, apart from providing the PES, the frequency based servo signal may also be further processed to generate an additional synchronization signal for write and read synchronization for the data storage device (e.g. HDD), for example allowing simultaneous data writing to the recording layer and reading of the servo signal from the servo layer. This may allow increased precision in tracking movement of the head, even during writing.

For a data storage device with an embedded servo, the clock used to trig the write buffer is a free-run fixed clock during the writing of data. In order to decode the sequential readback data correctly, timing recovery is needed to generate a synchronization signal such that the readback data is sampled synchronously. The timing recovery is done by including a preamble in front of the data sectors and scrambling the user data, wherein the preamble is used to initialize a digital phase lock loop (DPLL) and the scrambling is used to prevent transitions in user data which may cause the DPLL to lose the phase lock. The scrambling of user data may reduce the coding efficiency for the read write channel.

For a data storage device with a dedicated servo, a preamplifier is enabled with read/write simultaneously. Thus, the recording information on the servo layer is always available. If a reference clock synchronized to disk rotation can be recovered from the information on the servo layer, synchronous writing can be implemented. Since all data is writing synchronized to the reference clock recovered from the servo data, it is not necessary to add preambles in front of user data and to scramble user data. This would improve the code rate for the channel.

In the design of dedicated servo shown in FIG. 4, the AGC 382, the SAM 384, the GrayCode 386 and the servo bursts 388 are synchronized during servo writing, and can be used for timing recovery. The readback of servo bursts may not be used for timing recovery, since the amplitude of servo bursts may vary with the off-track position of the read/write head. The AGC, SAM and GrayCode can be used for timing recovery, but are not continuous and sustain the clock synchronized for the length of data sector by coasting. In other words, the synchronization signal may not be maintained by coasting for the duration of the data sector 390.

Various embodiments provide a data storage device and a method for generating a reference clock signal for synchronization of at least one of a read and a write operation of the data storage device.

One embodiment is directed to a data storage device. The data storage device includes a recording medium having a dedicated servo layer for providing servo information. The dedicated servo layer may include a plurality of servo patterns, wherein each servo data (e.g. each servo pattern) includes a preamble providing information for synchronization of at least one of a read and a write operation of the data storage device.

In an embodiment, the preamble may include or may be represented by a burst of periodic signal of a predetermined frequency, and can be aligned in cross track in servo writing process. The periodic signal may be used for the generation of a reference clock signal for synchronization of at least one of a read and a write operation of the data storage device.

According to an embodiment, each servo data (e.g. each servo pattern) may further include one or more servo bursts for providing positioning information. The length or duration of the servo bursts may be dependent on coasting capability of a phase lock loop circuit, which may in turn depend on the leakage current of the capacity of the phase lock loop circuit. For example, the PLL circuit in current technology can keep for a duration of longer than 5 µs.

In one embodiment, each servo pattern may include a plurality of the preambles arranged next to the servo burst. For example, the servo pattern may have a pattern as "preamble, servo burst, preamble, preamble, preamble, preamble . . . ". The plurality of preambles in this embodiment may be synchronized with each other.

In another embodiment, each servo pattern may include a plurality of alternately arranged preambles and servo bursts. For example, the servo pattern may have a pattern as "preamble, servo burst, preamble, servo burst, preamble, servo burst . . . ". The plurality of preambles may be synchronized with each other.

In a further embodiment, each servo pattern may further include a plurality of further preambles arranged after the plurality of alternately arranged preambles and servo bursts. For example, the servo pattern may have a pattern as "preamble, servo burst, preamble, servo burst, preamble, servo burst, preamble, preamble, preamble, . . . ". The plurality of preambles and the further preambles may be synchronized with each other in this embodiment.

According to an embodiment, the dedicated servo layer may include a plurality of sectors. Each sector may include one of the plurality of servo patterns described in various embodiments above.

In the context of various embodiments, the dedicated servo layer may include a plurality of concentric tracks for holding/storing the servo information. Each servo track may include a plurality of sectors, each having a servo pattern. In an embodiment, each servo track may further include a blank portion, which may be arranged adjacent to the servo pattern.

In various embodiments, the recording medium further include a data layer configured to record data therein. The data layer may be separate from and arranged above the dedicated servo layer, with the data layer being proximal to the head and the servo layer being distal to the head. Further, in an embodiment, the servo layer and the data layer may be put on the same side and may be read and/or processed together, which may also be referred to as dedicated servo.

In an embodiment, the data layer may include a plurality of sectors, wherein each sector may include a user data portion and a parameter portion.

In an embodiment, the user data portion of each sector may be located corresponding to the servo pattern of the corresponding section in the dedicated servo layer, and the parameter portion of each sector may be located corresponding to the blank portion of the corresponding sector in the dedicated servo layer.

The parameter portion may include address information, for example. In an embodiment, the parameter portion in the data layer may include one or more of an automatic gain control (AGC), a sector address mark (SAM), and a GrayCode. The AGC may be used to normalize the amplitude of a readback signal for SAM and GrayCode detection. The SAM may provide down-track information indicating the number of sector the head is crossing. The GrayCode may provide off-track information indicating the track number the head is following, which may be used for track seeking.

In an embodiment, servo bursts of a single frequency may be recorded in each servo track. In an embodiment, servo bursts of different frequencies may be recorded in adjacent servo tracks. In the context of various embodiments, adjacent servo tracks mean tracks that are arranged side-by-side. In various embodiments, two adjacent servo tracks share a common boundary.

In various embodiments, the servo bursts may AB or ABCD servo bursts which are located at different off-track position and different down-track position of the dedicated servo layer, or located at different off-track position but the same down-track position.

According to an embodiment, the data storage device may further include a phase lock loop circuit configured to generate a reference clock signal (also referred to as a synchronization signal) for synchronization of at least one of a read and a write operation based on the servo pattern. The phase lock loop circuit may be a digital phase lock loop circuit in an embodiment.

In various embodiments, the reference clock signal may be configured for recording channel timing recovery in a read operation carried out by means of the head, and for synchronizing a write operation carried out by means of the head. In an embodiment, the head may read the servo signal from the servo layer and may write data to the data recording layer simultaneously.

In the context of various embodiments, the data storage device may be a hard disk drive (HDD).

In the context of various embodiments, the term "head" may include a magnetic head. In addition, the "head" may refer to the read/write head for reading/writing information or data from/to a storage/recording medium. The head includes a reader and a writer. The head is positioned over a storage medium and the reader may read signal or information from the storage medium and the writer may write information to the storage medium.

In the context of various embodiments, a data storage device includes a spindle which refers to a mechanical part, which may be rotatable, and that may serve as an axis for a rotatable part held by the spindle. As a non-limiting example, in a hard disk drive, the spindle holds a circular disk (or platter) as storage medium that holds data. A spindle index signal is generated each time the spindle makes a rotation, thereby providing an indication that the spindle has made one rotation (360-degree rotation) in a period between the generation of one spindle index signal and the generation of the next spindle index signal.

Another embodiment is directed to a recording medium having a dedicated servo layer for providing servo information. The dedicated servo layer may include a plurality of servo patterns, wherein each servo pattern includes a preamble providing information for synchronization of at least one of a read and a write operation of the data storage device.

The recording medium may be used in various types of data storage devices according to various embodiments.

A further embodiment is directed to a method for generating a reference clock signal for synchronization of at least one of a read and a write operation of a data storage device. The method may include generating the reference clock signal based on a plurality of servo patterns stored in a dedicated servo layer of the data storage device, wherein each servo pattern includes a preamble providing information for synchronization of at least one of a read and a write operation of the data storage device.

Various features described above in the context of the data storage device may analogously hold true for the method of generating a reference clock signal for synchronization of at least one of a read and a write operation of a data storage device, and vice versa.

In an embodiment, the method may include reading the plurality of servo patterns in the dedicated servo layer of the data storage device.

In an embodiment, the method may include initializing a phase lock loop circuit upon reading of a preamble in the dedicated servo layer, so as to generate the reference clock signal synchronous with the preamble.

In another embodiment, the servo pattern may include a servo burst for providing positioning information as described in various embodiments above. The method may further include coasting the phase lock loop circuit upon reading of the servo burst, so as to keep both the frequency and the phase of the generated reference clock signal.

In an embodiment, the method may further include initializing a digital phase lock loop circuit during the coasting of the phase lock loop circuit.

In another embodiment, the method may include initializing the phase lock loop circuit using one or more of the AGC, SAM and GrayCode stored in the data layer of the data storage device as described above.

According to a further embodiment, the method may include initializing a digital phase lock loop circuit using the AGC, and then make the digital phase lock loop circuit coasting, holding on current frequency and phase, when crossing the servo bursts. Then, the digital phase lock loop circuit may be regulated (e.g. re-initialized) using the preambles in the servo pattern, and is coasting when crossing the servo bursts in the servo pattern. This process may be repeated when the head is crossing a plurality of sectors of servo data on the servo layer.

According to an embodiment, the servo pattern may include a plurality of alternately arranged preambles and servo bursts. The reference clock signal may be generated by repeating the initializing and the coasting of the phase lock loop circuit, upon reading of the alternately arranged preambles and servo bursts.

A further embodiment is directed to a device for generating a reference clock signal for synchronization of at least one of a read and a write operation of a data storage device. The device may include a reference clock signal generator configured to generate the reference clock signal based on a plurality of servo patterns stored in a dedicated servo layer of the data storage device, wherein each servo pattern includes a preamble providing timing information for synchronization in a read and a write operation of the data storage device.

The reference clock signal generator may be a reference clock signal generating circuit. In an embodiment, the reference clock signal generator may include a phase lock loop circuit or a digital phase lock loop circuit.

Various features described above in the context of the method of generating a reference clock signal for synchronization of at least one of a read and a write operation of a data storage device may analogously hold true for the corresponding device for generating the reference clock signal.

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In this context, the data storage device and the device for generating a reference clock signal as described in this description may include a memory which is for example used in the processing carried out by the data storage device and the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

Figure 5:
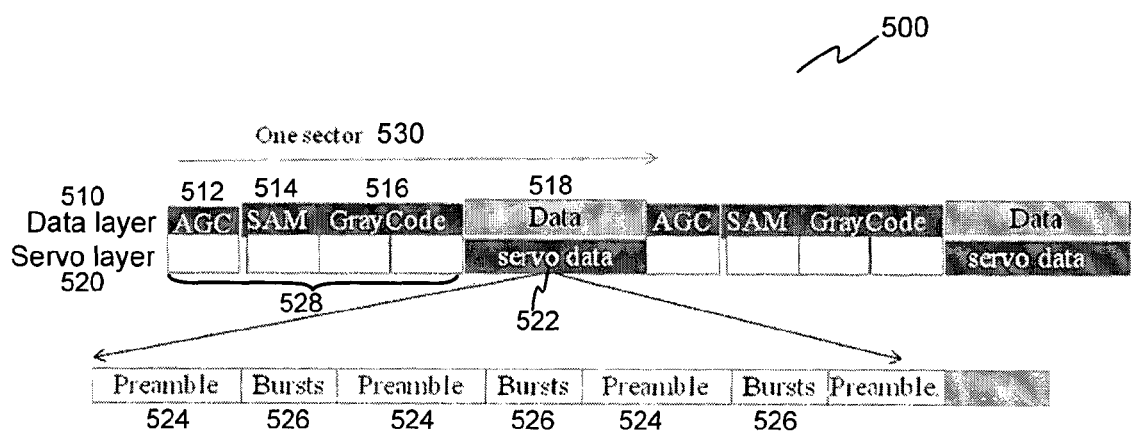
FIG. 5 shows a recording medium having a servo data layer according to an embodiment, wherein the structure of the servo data layer incorporates preambles for timing reference.

FIG. 5 shows a layout for disk recording medium 500 according to an embodiment.

As shown in FIG. 5, the recording medium 500 includes a data layer 510 for storing data and a servo layer 520 for storing servo data, wherein the servo layer 520 is arranged below the data layer 510.

The data layer 510 and the servo layer 520 may each include a plurality of sectors 530.

In one sector 530, the data layer may include a parameter portion for storing address information or relevant control parameters. In an embodiment, the parameter portion may include AGC 512, SAM 514 and GrayCode 516 as described above. Each sector 530 of the data layer further include a data portion for storing data 518, i.e. user data.

In the servo layer 520, each sector may include a servo pattern for storing servo data 522. The servo pattern 522 may include one or more preambles 524 providing information for synchronization of at least one of a read and a write operation of the data storage device. The preambles 524 may be synchronized with each other. When the read write head crosses the preamble 524, a PLL circuit may be initialized, so as to generate a reference clock signal for synchronization of read and/or write operations. In another embodiment, one or more of the AGC 512, SAM 514 and GrayCode 516 may be used to initialize the PLL circuit for the purpose of generating the reference clock signal.

The servo pattern 522 may further include one or more servo bursts 526 for providing positioning information, which may be used for demodulation of PES, for example. The sampling frequency may be determined by the number of servo burst in one revolution. Since the entire servo layer is for storing servo information, the servo layer may include as many servo bursts or servo patterns as possible.

In an embodiment, the AGC 512, SAM 514, GrayCode 516 and preambles 524 may be written synchronously on the recording medium by servo track writing (STW).

In an embodiment as shown in FIG. 5, the servo pattern 522 includes a plurality of alternately arranged preamble 524 and servo bursts 526. In other embodiments, the servo pattern 522 may include various number of preamble and servo bursts, e.g. as "preamble, servo burst", or "preamble, servo burst, preamble, preamble, preamble, . . . ", or "preamble, servo burst, preamble, servo burst, preamble, preamble, preamble, . . . ", etc. Since only a few cycles of servo bursts may be enough for PES demodulation, each servo pattern may include the required number of servo bursts alternately arranged with the synchronized preambles and is filled with preambles in the remaining of the servo pattern.

In an embodiment, each sector in the servo layer may further include a blank portion 528 located corresponding to the parameter portion (512, 514, 516) of the data layer 510. In an embodiment when the readback signal of the servo pattern 522 has interference from the data layer 510, the reading of the parameter portion may be used for initialization of the PLL circuit. In an embodiment when the parameter portion is used for initialization of the PLL circuit, the blank portion 528 may avoid interference to the corresponding parameter portion of the data layer 512.

Figure 6:
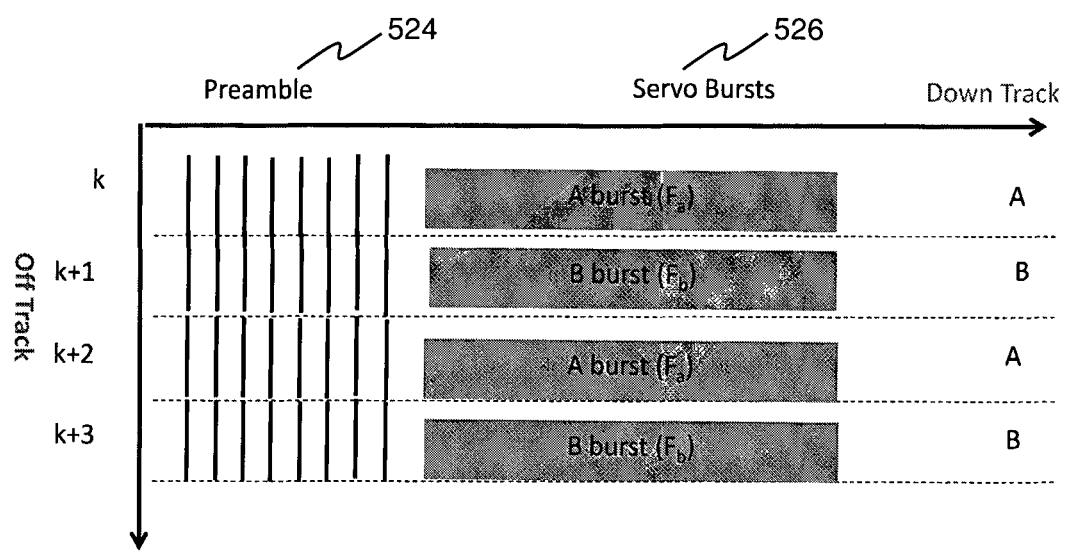
FIG. 6 shows a layout of servo patterns in a plurality of tracks according to an embodiment.

FIG. 6 shows a plurality of servo patterns in a plurality of tracks according to an embodiment.

In FIG. 6, a plurality of tracks denoted as k, k+1, k+2, k+3 are shown in the off-track direction. Along each track, a servo pattern is shown including a preamble 524 and a servo burst 526. In this example, the preamble 524 includes a train of transitions (e.g. pulses) repeated at a predetermined frequency. The preamble 524 may include other types of signal having a predetermined frequency in other embodiments. Upon reading the preamble 524, a PLL circuit may be initialized, and is tuned to synchronize with the preamble 524, for the purpose of generating a reference clock signal for synchronization of read and/or write operations.

In an example, the servo bursts 526 may be a AB type burst including a A burst having a frequency of $F_a$ and a B burst having a frequency of $F_b$. The frequency $F_a$ and the frequency of $F_b$ may be different in an embodiment, and may be the same in another embodiment. The servo bursts 526 at adjacent tracks may be at the same down-track position as shown in FIG. 6. In other embodiment, the servo bursts 526 may include other types of bursts having various formats, e.g. a ABCD burst.

The length of the servo burst 526 may be dependent on or limited by coasting capability of a PLL circuit. For example, during the period when the servo burst is being read, the PLL circuit is coasted such that both the phase and the frequency of the reference clock signal generated by the PLL circuit is kept. In an example, the PLL circuit used in the data storage device may have a coasting capability allowing the coasting of the PLL circuit for a period of not more than 3 µs, without losing the phase and frequency lock. In an illustrative example while reading/crossing 10 cycles for AB bursts of 100 MHz, the coasting time may be about 0.2 µs. In other embodiments, the PLL circuit may have a coasting capability allowing the coasting of the PLL circuit for a period of about 5 µs or longer.

In other embodiments, the length of the servo burst 526 may be determined by the requirement of the demodulation scheme which is necessary to perform the PES demodulation.

Figure 7:
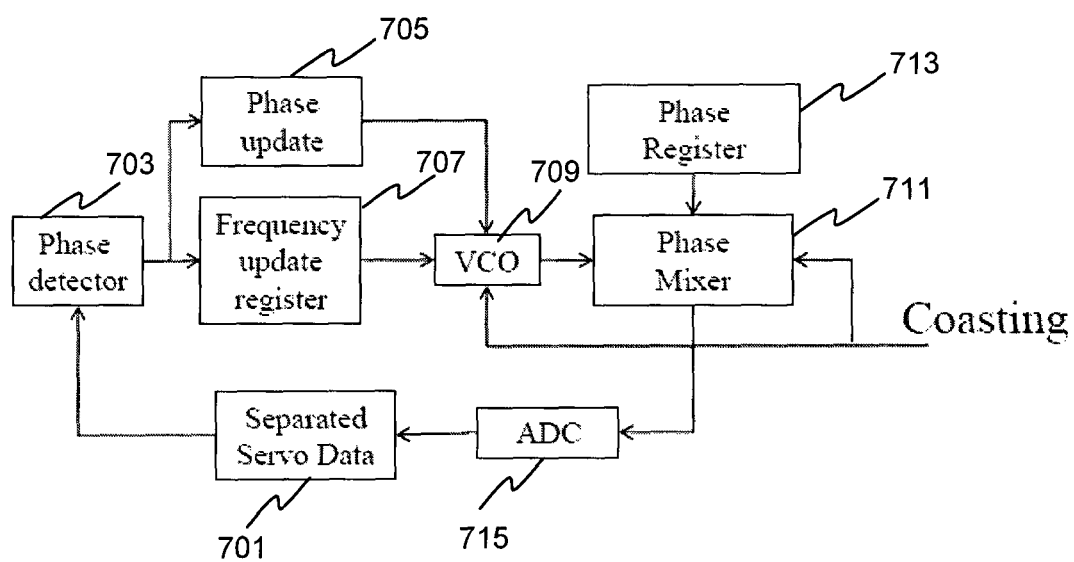
FIG. 7 shows a block diagram for timing recovery according to an embodiment.

FIG. 7 shows a block diagram for timing recovery according to an embodiment.

In FIG. 7, servo pattern and data from the recording medium are separated at servo & data separator 701. Servo data from the dedicated servo layer, for example, the signal representing the preamble in the servo pattern, may be input to a phase detector 703. The output of the phase detector 703 is input to a phase update 705 and a frequency update register 707. And a VCO (voltage controlled oscillator) 709 is configured to receive signals output from the phase update 705 and the frequency update register 707. The output signal of the VCO 709 is input to a phase mixer 711, which receives a signal output from a phase register 713 and output a phase mixed signal. The phase mixed signal output from the phase mixer 711 is converted to a digital signal at a ADC (analog-to-digital converter) 715, and the digital signal output from the ADC 715 is transmitted to the servo & data separator 701.

In an embodiment, the phase detector 703 is configured to detect the phase difference between the output signal of the VCO 709 and the readback servo signal. The frequency update register 707 and the phase update 705 blocks are configured to control the VCO 709 to generate a clock signal of a frequency which is a multiple of the frequency of preambles or AGC in the readback servo signal, without phase difference, The phase mixer 711 is configured to compensate the consistent circuit delay to ensure ADC samples at peak points.

In an embodiment, when a signal representing a preamble of the servo pattern or a signal representing the AGC is received through the phase detector 703, the operation of the VCO 709 may be controlled to generate an output signal synchronized with the signal representing the preamble of the servo pattern or the AGC. The operation of VCO 709 is also controlled by a coasting signal. The coasting signal may cause the VCO 709 to free run at its current frequency. When a costing signal is received, the VCO 709 and the phase mixer 711 are controlled to keep the phase and/or the frequency of the generated signal from the VCO 709.

The phase detector 703, the phase update 705, the frequency update register 707, the VCO 709, the phase mixer 711 and the phase register 713 may form a phase locked loop circuit. In an embodiment, the phase detector 703 may be a digital phase detector, so as to provide a digital phase locked loop circuit. In another embodiment, both an analog phase lock loop circuit and a digital phase lock loop circuit may be used for the generation of the reference clock signal.

Figure 8:
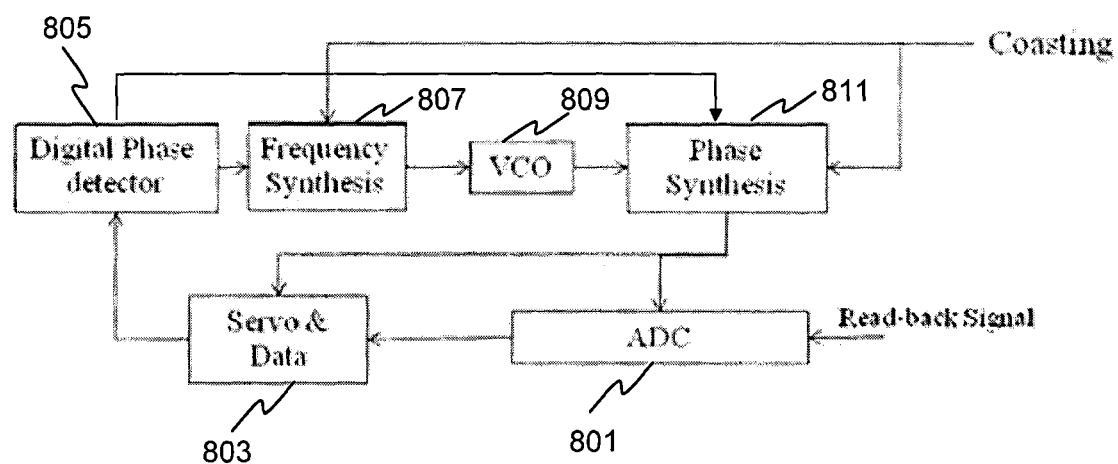
FIG. 8 shows a block diagram for timing recovery according to another embodiment.

FIG. 8 shows a block diagram for timing recovery according to another embodiment.

In FIG. 8, a read-back signal is A/D converted at a ADC (analog-to-digital converter) 801, and then separated at 803 for to obtain servo information and data. Servo data from the dedicated servo layer, for example, the signal representing the preamble in the servo pattern, may be input to a digital phase detector 805. The output of the phase detector 805 is input to a frequency synthesizer 807 and a phase synthesizer 811. A VCO (voltage controlled oscillator) 809 is configured to receive signal output from the frequency synthesizer 807, and generate an output signal. The output signal of the VCO 807 is input to the phase synthesizer 811. The output signal from the phase synthesizer 811 is transmitted to the ADC 801 and the servo & data separator 803.

In an embodiment, when a signal representing a preamble of the servo pattern is received through the phase detector 805, the operation of the VCO 809 may be controlled to generate an output signal synchronized with the signal representing the preamble of the servo pattern. When a costing signal is received, the frequency synthesizer 807 and the phase synthesizer 811 are controlled so as to generate a signal with locked phase and/or frequency. The digital phase detector 805, the frequency synthesizer 807, the VCO 809 and the phase synthesizer 811 may form a digital phase locked loop (DPLL) circuit. The coasting signal may cause the DPLL circuit to free run at its current frequency.

With the preamplifier to support read/write simultaneously, the read-back signal in FIG. 8 has enough preamble components to sustain the DPLL to function, and the DPLL will provide the synchronized reference clock for writing and data decoding. The read-back signal may have interference from the data layer, and may not be used to initialize the DPLL. The AGC on the data layer may be used to initialize the DPLL.

Figure 9:
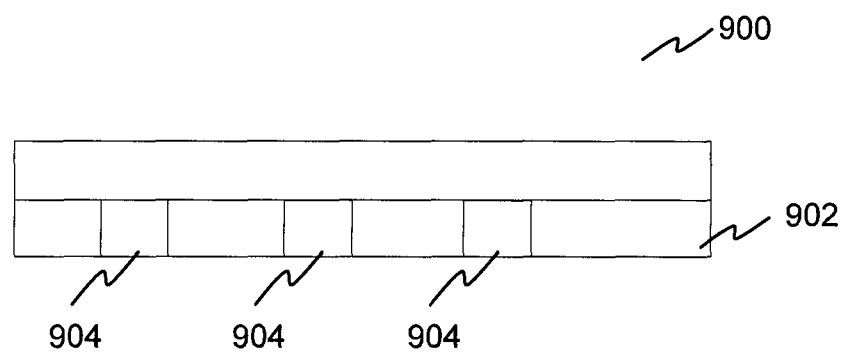
FIG. 9 shows a recording medium included in a data storage device according to an embodiment.

FIG. 9 shows a recording medium according to an embodiment, which may be included in a data storage device. The recording medium 900 includes a dedicated servo layer 902 for providing servo information. The dedicated servo layer 902 may include a plurality of servo patterns, wherein each servo pattern includes a preamble 904 providing information for synchronization of at least one of a read and a write operation of the data storage device. Although three preambles 904 are shown in FIG. 9, it is understood that the dedicated servo layer 902 may include one preamble, two preambles, or a plurality of preambles in various embodiments. The recording medium 900 and the dedicated servo layer 902 may have various arrangement of servo patterns according to various embodiments described above.

FIG. 10 shows a flowchart illustrating a method for generating a reference clock signal for synchronization of at least one of a read and a write operation of a data storage device according to an embodiment. At 1002, the reference clock signal is generated based on a plurality of servo patterns stored in a dedicated servo layer of the data storage device, wherein each servo pattern includes a preamble providing information for synchronization of at least one of the read and the write operation of the data storage device. Various embodiments of the method have been described above.

FIG. 11 shows a device 1100 for generating a reference clock signal for synchronization of at least one of a read and a write operation of a data storage device according to an embodiment. The device 1100 may include a reference clock signal generator 1102 configured to generate the reference clock signal based on a plurality of servo patterns stored in a dedicated servo layer of the data storage device, wherein each servo pattern includes a preamble providing information for synchronization of at least one of a read and a write operation of the data storage device. The device 1100 may be configured to perform various embodiments of the method for generating the reference clock signal as described above.

Various embodiments provide a magnetic recording system having a dedicated servo layer in the recording medium. According to various embodiments, initialization of the digital phase lock loop circuit requires less dedicated preamble because of continuous data read write. Various embodiments relate to timing recovery in magnetic recording system, and particularly relate to the read write channel in disk drive which uses timing recovery to achieve synchronously sampling of the read-back data. Various embodiments realize timing recovery in hard disk drive using dual-layer media with a design of servo pattern for the servo layer. Various embodiments of the method may be applied for various formats of servo bursts. Various embodiments use coasting for PLL to do timing recovery for a buried servo, such that preambles and scrambling in data sectors are not needed. Various embodiments use AGC to initialize DPLL, and the user data is not necessary to include preambles. With the timing recovery scheme enabling the preamplifier to read and write simultaneously, synchronously writing for TDMR (Two Dimensional Magnetic Recording) and BPMR (Bit Patterned Media Recording) can be implemented.

According to various embodiments, when the head is crossing the preambles on the servo layer, it will tune the digital pulse lock loop circuit or the pulse lock loop circuit to synchronize. When the head crosses the servo bursts on the servo layer, the pulse lock loop circuit is coasted for a short period without losing the phase lock.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data storage device, comprising:
a recording medium having a dedicated servo layer for providing servo information,
wherein the dedicated servo layer comprises a plurality of servo patterns, each servo pattern comprising (i) a preamble providing information for synchronization of at least one of a read operation and a write operation of the data storage device, and (ii) subsequent to the preamble, a servo burst including the servo information, and
wherein each preamble comprises a sequence of pulses repeated at a predetermined frequency; and
a timing recovery circuit configured to (i) receive a signal based on the sequence of pulses repeated at the predetermined frequency in the preamble, (ii) detect a phase of the signal, and (ii) generate, based on the detected phase, a reference signal for the synchronization of the at least one of the read operation and the write operation.

2. The data storage of claim 1, wherein a length of the servo burst is dependent on coasting capability of a phase lock loop circuit of the timing recovery circuit.

3. The data storage device of claim 1, wherein each servo pattern further comprises a plurality of the preambles arranged next to the servo burst.

4. The data storage device of claim 3, wherein the preambles are synchronized with each other.

5. The data storage device of claim 1, wherein each servo pattern comprises a plurality of alternately arranged preambles and servo bursts.

6. The data storage device of claim 5, wherein each servo pattern further comprises a plurality of further preambles arranged after the plurality of alternately arranged preambles and servo bursts.

7. The data storage device of claim 6, wherein the preambles and the further preambles are synchronized with each other.

8. The data storage device of claim 1, wherein the dedicated servo layer comprises a plurality of sectors, each sector comprising one of the plurality of servo patterns.

9. The data storage device of claim 8, wherein each sector of the dedicated servo layer comprises a blank portion.

10. The data storage device of claim 9, wherein the recording medium further comprises a data layer configured to record data therein.

11. The data storage device of claim 10, wherein the data layer comprises a plurality of sectors, each sector comprising a user data portion and a parameter portion,
the user data portion being located corresponding to the servo pattern of the dedicated servo layer, and the parameter portion being located corresponding to the blank portion of the dedicated servo layer.

12. A method for generating a reference clock signal for synchronization of at least one of a read operation and a write operation of a data storage device, the method comprising:
- generating the reference clock signal based on a plurality of servo patterns stored in a dedicated servo layer of the data storage device,
- wherein each servo pattern comprises (i) a preamble providing information for synchronization of at least one of the read operation and the write operation of the data storage device, and (ii) subsequent to the preamble, a servo burst including servo information,
- wherein each preamble comprises a sequence of pulses repeated at a predetermined frequency, and
- wherein generating the reference clock signal includes, using a timing recovery circuit,
  - receiving a signal based on the sequence of pulses repeated at the predetermined frequency in the preamble,
  - detecting a phase of the signal, and
  - generating, based on the detected phase, the reference clock signal for the synchronization of the at least one of the read operation and the write operation.

13. The method of claim 12, further comprising:
initializing a phase lock loop circuit upon reading of the preamble in the dedicated servo layer to generate the reference clock signal synchronous with the preamble.

14. The method of claim 13, further comprising:
coasting the phase lock loop circuit upon reading of the servo burst in the dedicated servo layer maintain both a frequency and a phase of the generated reference clock signal.

15. The method of claim 14, further comprising:
initializing a digital phase lock loop circuit during the coasting of the phase lock loop circuit.

16. The method of claim 13, further comprising:
initializing the phase lock loop circuit using one or more of an automatic gain control, a sector address mark, and a GrayCode stored in a data layer of the data storage device.

17. The method of claim 14, further comprising:
repeating the initializing and the coasting of the phase lock loop circuit during the reading of a servo pattern having a plurality of alternately arranged preambles and servo bursts.

* * * * *